United States Patent
Mitsuyoshi et al.

[11] Patent Number: 6,066,828
[45] Date of Patent: May 23, 2000

[54] LASER BEAM WELDING METHOD FOR CARBON STEELS

[75] Inventors: Hiroshi Mitsuyoshi; Kaoru Kitamura, both of Kumamoto, Japan

[73] Assignee: Honda Giken Kogyo Kabushiki Kaisha, Tokyo, Japan

[21] Appl. No.: 09/062,139

[22] Filed: Apr. 17, 1998

[30] Foreign Application Priority Data

Apr. 24, 1997 [JP] Japan ................................. 9-106981

[51] Int. Cl.⁷ ................................................. B23K 26/32
[52] U.S. Cl. ...................................................... 219/121.64
[58] Field of Search ........................ 219/121.63, 121.64; 148/525, 583; 228/262.41; 384/537

[56] References Cited

U.S. PATENT DOCUMENTS

| | | | |
|---|---|---|---|
| 5,529,646 | 6/1996 | Nakajima et al. ................... | 148/525 |
| 5,628,449 | 5/1997 | Onuma et al. ...................... | 219/121.64 |
| 5,828,032 | 10/1998 | Krzys et al. ....................... | 219/121.64 |
| 5,927,866 | 7/1999 | Bertetti .............................. | 384/537 |

FOREIGN PATENT DOCUMENTS

| | | | |
|---|---|---|---|
| 2639858 | 6/1990 | France ................................ | 219/121.64 |
| 58-70990 | 4/1983 | Japan ................................. | 228/262.41 |
| 6-71469 | 3/1994 | Japan ................................. | 219/121.64 |
| 9-220901 | 8/1997 | Japan . | |

*Primary Examiner*—Geoffrey S. Evans
*Attorney, Agent, or Firm*—Merchant & Gould P.C.

[57] ABSTRACT

The invention relates to a laser beam welding method for carbon steels applied to laser beam welding of carbon steels of different carbon content, and in order to improve uniformity of fused metal in the welded region, a laser beam is applied obliquely to the joint region between the carbon steels from the side of the carbon steel having the lower carbon content. When manufacturing a vehicle wheel 1 by this method, the laser beam is applied obliquely from the side of the hub 3 of rolled steel plate which contains about 0.1% of carbon to the joint region with the boss 2 of carbon steel for machine structural use which contains about 2% of carbon so as to fuse the end of the hub 3 and cause it to penetrate into the welded region.

4 Claims, 3 Drawing Sheets

(A)

(B)

(A)

(B)

LASER BEAM WELDING METHOD FOR CARBON STEELS

BACKGROUND OF THE INVENTION

1. Field of the Invention

The present invention relates to a laser beam welding method for carbon steels of different carbon content.

2. Description of Related Art

Heretofore, as a welding technology for vehicle wheels, the laser beam welding method as disclosed in patent application No. H8-28358 is proposed by the applicant. In this method, in order to reduce time in manufacturing and to obtain processing efficiency, when welding a vehicle wheel of four component parts comprising a rim, a spoke, a hub and a boss, joint regions between the rim and the spoke, between the spoke and the hub, and between the hub and the boss, for example, are welded to each other by a laser beam welding method which is less affected by thermal strain or the like.

By the way, the component parts such as the rim, the spoke and the hub or the like are formed of rolled steel plate of less carbon content for obtaining good workability or the like, while the boss which bears a direct load from the wheel axle is formed of carbon steel for machine structural use which contains more carbon and is harder than the rolled steel plate. In the case of laser beam welding the hub with the boss of different carbon content therefrom, when applying the laser beam perpendicularly to the joint region, hardening areas are apt to be produced with respect to the welded region. Namely, as seen in FIGS. 4(A), 4(B), when the laser beam is applied perpendicularly to the joint region between a cylindrical boss 51 and a hub 52 from the direction of the arrow in FIG. 4(A) so as to join them to each other by fusing and welding the end of the boss 51 into the welded region, there may be cases like that shown in FIG. 4(B) where a hardening area c is produced in the welded region y. This hardening area c will be caused due to reasons such as when the laser beam is applied to the side of the steel having a greater carbon content, a portion having a greater carbon content and a portion having a lower carbon content are generated with respect to fused metal in the welded region through the application of the laser beam welding comprising rapid heating and rapid quenching and such as when the welded metal is solidified, the portion of greater carbon content stays there as the hardening area.

SUMMARY OF THE INVENTION

It is therefore an object of the present invention to provide an improved laser beam welding method for carbon steels which is capable of preventing the production of hardening areas in the welded joint region so as to obtain uniform welding condition and good welding quality, when laser beam welding together different kinds of carbon steels having different carbon contents, such as a hub and a boss of a wheel for a vehicle.

With a view to accomplishing the object described above, a laser beam welding method for carbon steels according to the present invention comprises fusing and welding a joint region between the carbon steels each containing a different carbon content by applying a laser beam to the joint region, wherein the laser beam is applied obliquely from the side of the carbon steel having a lower carbon content to the joint region.

When applying the laser beam obliquely from the side of the carbon steel having a lower carbon content to the joint region in the above described manner, the end portion of the carbon steel of lower carbon content is fused to penetrate into the joint region so that the welded region may be formed in smooth configuration without using a filler wire or the like and so that any carbon component is widely distributed to enhance uniformity of the fused metal in the welded region so as to prevent the production of hardening areas.

In a preferred form of the invention, the carbon steel having a lower carbon content is a rolled steel plate and the other carbon steel is a carbon steel for machine structural use. The rolled steel plate comprises a steel plate such as that designated as SPC, SPH, SPAH or the like according to the Japanese Industrial Standards (hereinafter, referred to as "JIS") and the carbon steel for machine structural use comprises a carbon steel such as designated as S20C or the like in the JIS code.

The carbon steel for machine structural use contains 0.15% or more carbon, and the rolled steel plate contains less than 0.15% carbon. The laser beam welding method of the present invention is effectively applied especially to welding between carbon steels of such different carbon content.

In another aspect of the present invention, the laser beam welding method for carbon steels is applied to joining a joint region between a hub and a boss or between a spoke and a boss of a vehicle wheel. Generally, the boss of a vehicle wheel is formed of a carbon steel which contains more carbon in comparison with that forming the hub or the spoke. Therefore, the laser beam welding of the present invention is employed in the welding between the hub and the boss and between the spoke and the boss, wherein the laser beam is applied obliquely from the side of the hub or the side of the spoke. Herein, the welding between the hub and the boss is applied with respect to a wheel comprising four component parts, while the welding between the spoke and the boss is applied with respect to a wheel comprising three component parts.

The above and other objects and the attendant advantages of the present invention will become apparent by reference to the following detailed description when considered with accompanying drawings.

DETAILED DESCRIPTION OF PREFERRED EMBODIMENT

Figure 1:
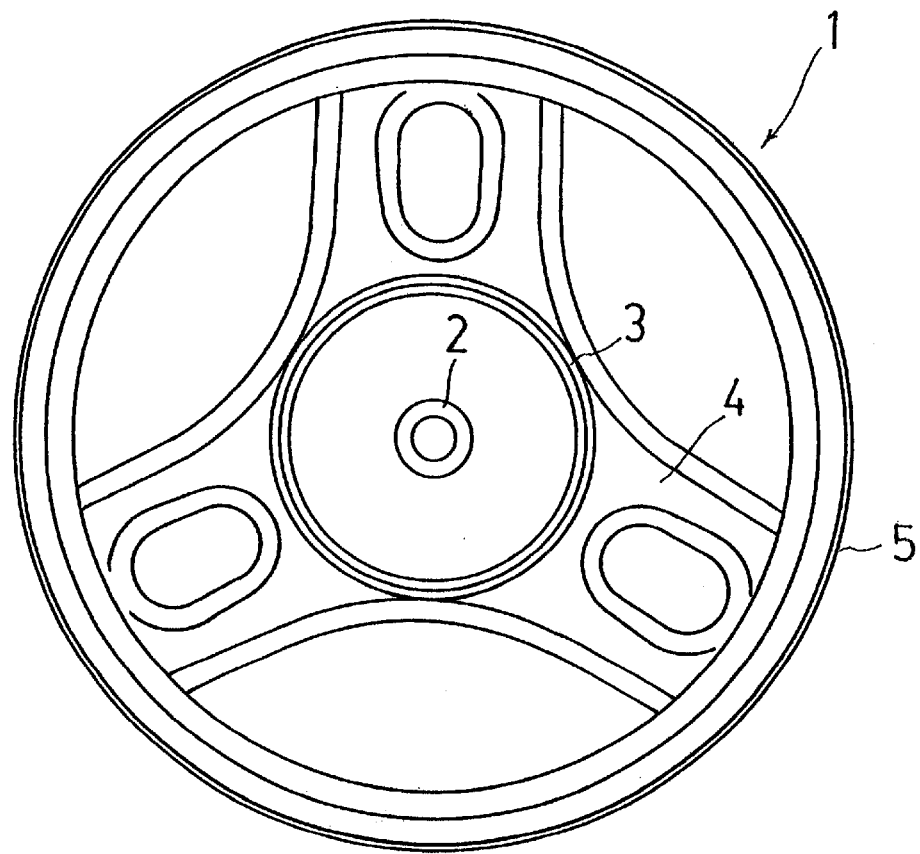
FIG. 1 is a plan view of a vehicle wheel, to which a laser beam welding method according to the present invention is applied.
Figure 2:
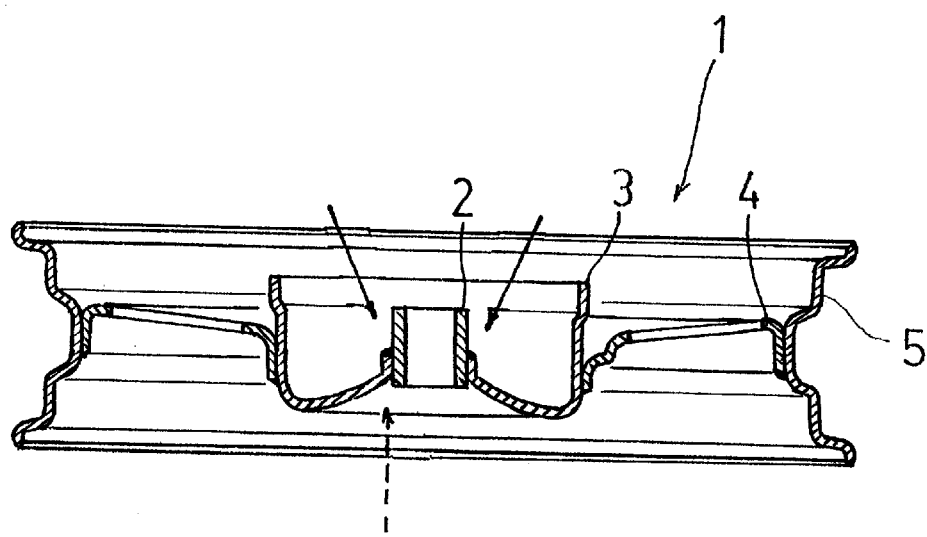
FIG. 2 is a longitudinal cross-sectional view of the items shown in FIG. 1.

The laser beam welding method according to this invention relates to welding art as employed to prevent hardening areas from being produced in welded regions and to improve uniformity of fused metal in the welded regions in the case of welding different kinds of carbon steels which are different in carbon content from each other, and it is applied to welding of a vehicle wheel 1 or the like as seen in FIGS. 1 and 2. This vehicle wheel 1 is formed with four component parts comprising a boss 2 for accommodating a wheel axle inserted thereinto, a hub 3 provided with an engaging hole to be engaged with the boss 2, a spoke 4 of generally triangular-shaped plate provided with an engaging opening to be engaged with the hub 3, and a rim 5 surrounding the outer periphery of the spoke 4. Each joint portion between the boss 2 and the hub 3, between the hub 3 and the spoke 4, and between the spoke 4 and the rim 5, is welded respectively by the laser beam welding. The boss 2 among these component parts is formed by forging a carbon steel for machine structural use designated as S20C or the like in the JIS code system and contains about 0.18% to 0.23% of carbon. On the other hand, the hub 3, the spoke 4 and the rim 5 are each formed by press-forming or rim-forming rolled steel plates designated as SPC, SPH, SPAH or the like in the JIS code system and contain about 0.08% to 0.12% of carbon.

Figure 3:
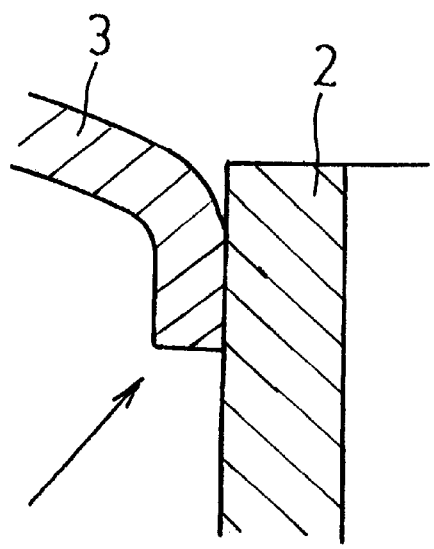
FIGS. 3(A) and 3(B) are explanatory views of the laser beam welding method according to the present invention.
Figure 3:
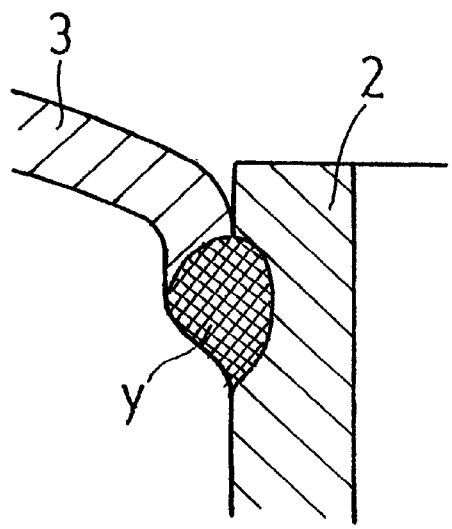
Figure 4:
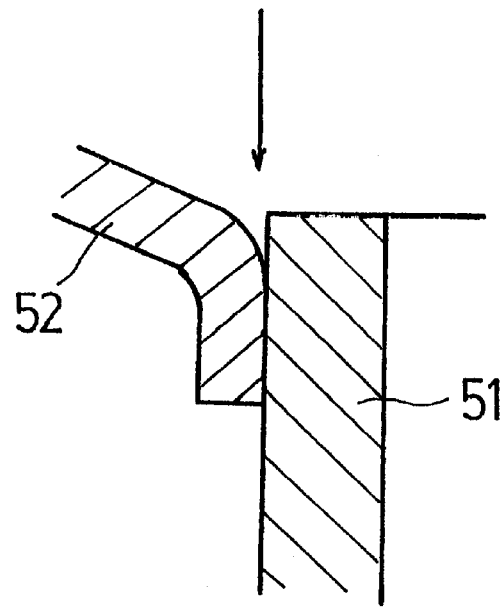
FIGS. 4(A) and 4(B) are explanatory views for explaining disadvantages in the prior art laser beam welding method.
Figure 4:
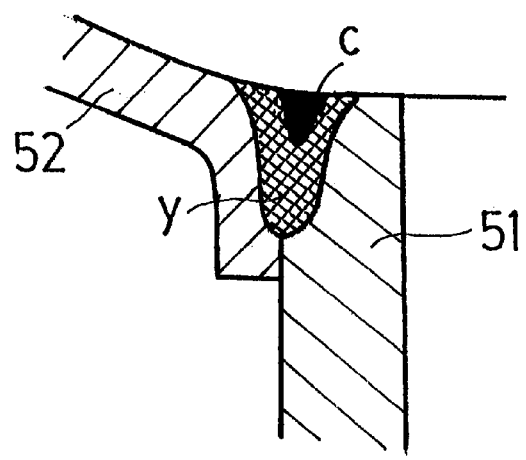

The question to be solved when laser beam welding these component parts is how to weld together carbon steels having different carbon content. Namely, in the laser beam welding of the joint region between the boss 2 and the hub 3, when the laser beam is applied to this joint region in the direction shown by the dotted line arrow in FIG. 2, a hardening area c is produced in the welded region y as seen in FIG. 4(B), as referred to in the foregoing. In the present invention, therefore, the laser beam is applied in the direction shown by the solid line arrows in FIG. 2 so as to weld the whole periphery of the joint region, for example, along the circumferential direction thereof. As seen in FIG. 3(A) on an enlarged scale, the laser beam is applied obliquely from the side of the hub 3 to the joint region between the boss 2 and the hub 3 so as to weld them together in a manner to fuse the upper end of the hub 3 into the joint region. Then, as seen in FIG. 3(B), the upper end of the hub 3 and a portion of the boss 2 are fused and penetrate into each other so that the welded region y may be formed in a smooth outer configuration without using a filler wire or the like and thereby production of hardening areas is prevented. In addition, when the laser beam is applied from the side of the hub 3 containing less carbon content, the uniformity of fused metal is facilitated and the ductility of the fused metal is improved so as to obtain the good follow-up ability with respect to contraction strain or the like at the time of solidification.

Not shown in the drawings, in the case of vehicle wheels of three components parts, the laser beam is applied obliquely to the joint region between a boss and a spoke from the side of the spoke containing less carbon content in such a way as to weld the end of the spoke into the joint region. Thus, the hardening areas will not be produced in the welded region similarly as described hereinabove.

While the invention has been described in its preferred embodiment as applied to a vehicle wheel by way of example, it is to be understood that the laser beam welding method according to the present invention is applicable generally to any welding between carbon steels of different carbon content as well as vehicle wheels. By applying the laser beam obliquely from the side of the carbon steel containing less carbon content to the joint region, hardening areas may be prevented from being produced in the welded joint region thereby improving the welding quality.

As described hereinabove, in the laser beam welding method according to the present invention, when welding different kinds of carbon steels formed having differing carbon content, the laser beam is applied obliquely from the side of the carbon steel having a lower carbon content to the joint region. Thus, the configuration of the welded region may be formed smoothly, and the production of hardening areas is effectively prevented thereby to improve the uniformity of fused metal. When the laser beam welding method according to the present invention is applied to welding between the hub and boss or the spoke and the boss of vehicle wheels, the welding quality of the vehicle wheels is raised so as to improve productivity.

What is claimed is:

1. A laser beam welding method for carbon steels comprising fusing and welding a joint region between said carbon steels, each containing a different carbon content, by applying a laser beam to the joint region, wherein the laser beam is applied obliquely from the side of the carbon steel having a lower carbon content to the joint region.

2. A laser beam welding method for carbon steels according to claim 1, wherein the carbon steel having a lower carbon content is a rolled steel plate of less than 0.15% in carbon content, and the other carbon steel has a carbon content equal to or more than 0.15%.

3. A laser beam welding method for carbon steels according to claim 2, wherein the method is applied to joining a joint region between a hub and a boss or between a spoke and a boss of a vehicle wheel, and the laser beam is applied obliquely from the side of said hub or said spoke to the joint region.

4. A laser beam welding method for carbon steels comprising fusing and welding a joint region between said carbon steels, each containing a different carbon content, by applying a laser beam to the joint region, wherein the laser beam is applied obliquely from the side of the carbon steel having a lower carbon content to an edge of the carbon steel having a lower carbon content.

\* \* \* \* \*